(12) United States Patent
Kashibuchi

(10) Patent No.: US 8,102,567 B2
(45) Date of Patent: Jan. 24, 2012

(54) IMAGE FORMING APPARATUS AND METHOD CALCULATING A DEVIATION BETWEEN A) A REPRESENTATIVE POINT OF THRESHOLD INFORMATION I) NEAREST TO THE COORDINATE OF A PIXEL OF INTEREST OR II) IN DITHER SPACE NEAREST TO THE ADDRESS COORDINATE OF THE PIXEL OF INTEREST IN DITHER SPACE, AND B) THE ADDRESS COORDINATE IN DITHER SPACE CORRESPONDING TO A PIXEL COORDINATE OF AN INTEGER IN PIXEL SPACE OR A PIXEL COORDINATE OF AN INTEGER IN PIXEL SPACE NEAREST TO THE REPRESENTATIVE POINT

(75) Inventor: Yoichi Kashibuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 419 days.

(21) Appl. No.: 12/397,628

(22) Filed: Mar. 4, 2009

(65) Prior Publication Data
US 2009/0225371 A1    Sep. 10, 2009

(30) Foreign Application Priority Data

Mar. 7, 2008   (JP) .................................. 2008-058529

(51) Int. Cl.
*H04N 1/405*   (2006.01)
*H04N 1/409*   (2006.01)

(52) U.S. Cl. ........ 358/1.9; 358/3.06; 358/3.13; 358/3.26
(58) Field of Classification Search .................. 358/1.9, 358/3.06, 3.13, 3.14, 3.21, 3.23, 3.26, 466, 358/533–536; 382/237, 270, 275; 347/131, 347/251
See application file for complete search history.

(56) References Cited

U.S. PATENT DOCUMENTS

| | | | |
|---|---|---|---|
| 4,499,489 A | 2/1985 | Gall et al. | 358/75 |
| 5,235,435 A | 8/1993 | Schiller | 358/456 |
| 5,930,396 A * | 7/1999 | Fiala et al. | 382/237 |
| 6,249,355 B1 * | 6/2001 | Trask | 358/1.9 |
| 2009/0080000 A1 | 3/2009 | Kashibuchi | 358/1.2 |

FOREIGN PATENT DOCUMENTS

| | | |
|---|---|---|
| JP | 55-6393 | 1/1980 |
| JP | 61-137473 | 6/1986 |
| JP | 6-30276 | 2/1994 |

OTHER PUBLICATIONS

Japanese Office Action dated Oct. 28, 2011, in counterpart Japanese Application No. 2008-058529, and English-language translation thereof.

* cited by examiner

*Primary Examiner* — Scott A Rogers
(74) *Attorney, Agent, or Firm* — Fitzpatrick, Cella, Harper & Scinto

(57) ABSTRACT

An image processing apparatus makes for making the halftone processing that can suppress a periodic pattern by periodically changing the correction amount while suppressing a dispersion in the area of each dot at a low computation cost.

8 Claims, 16 Drawing Sheets

| 0 | 28 | 169 | 56 | 85 | 113 | 198 | 141 | 226 | 254 |
|---|---|---|---|---|---|---|---|---|---|
| 141 | 226 | 254 | 0 | 28 | 169 | 56 | 85 | 113 | 198 |
| 85 | 113 | 198 | 141 | 226 | 254 | 0 | 28 | 169 | 56 |
| 28 | 169 | 56 | 85 | 113 | 198 | 141 | 226 | 254 | 0 |
| 226 | 254 | 0 | 28 | 169 | 56 | 85 | 113 | 198 | 141 |
| 113 | 198 | 141 | 226 | 254 | 0 | 28 | 169 | 56 | 85 |
| 169 | 56 | 85 | 113 | 198 | 141 | 226 | 254 | 0 | 28 |
| 254 | 0 | 28 | 169 | 56 | 85 | 113 | 198 | 141 | 226 |
| 198 | 141 | 226 | 254 | 0 | 28 | 169 | 56 | 85 | 113 |
| 56 | 85 | 113 | 198 | 141 | 226 | 254 | 0 | 28 | 169 |

189.74 LINES 18.4 DEGREES

FIG.4

|   | THx | | | | | | | | |
|---|---|---|---|---|---|---|---|---|---|
| THy | | 0 | 1 | ...... | 6 | 7 | 8 | 9 | | 14 | 15 |
| | 0 | 254 | 251 | ...... | 168 | 150 | 138 | 147 | ...... | 246 | 254 |
| | 1 | 247 | | | | 141 | 126 | | | | 250 |
| | ⋮ | ⋮ | | | | | | | | | ⋮ |
| | 6 | 153 | | | | 7 | 11 | | | | 140 |
| | 7 | 122 | 113 | | 9 | 3 | 2 | 6 | | 93 | 115 |
| | 8 | 112 | 104 | | 5 | 1 | 0 | 10 | | 88 | 107 |
| | 9 | 120 | | | | 8 | 4 | | | | 117 |
| | ⋮ | ⋮ | | | | | | | | | ⋮ |
| | 14 | 249 | | | | 109 | 106 | | | | 244 |
| | 15 | 253 | 245 | ...... | 160 | 139 | 128 | 137 | ...... | 248 | 252 |

|     |   | Cx   |      |      |      |
| --- | - | ---- | ---- | ---- | ---- |
|     |   | 0    | 1    | 2    | 3    |
| Cy  | 0 | 1.00 | 0.90 | 0.80 | 0.72 |
|     | 1 | 0.85 | 0.95 | 0.68 | 0.76 |
|     | 2 | 0.70 | 0.63 | 0.90 | 0.81 |
|     | 3 | 0.60 | 0.67 | 0.77 | 0.86 |

Hc (height), Wc (width)

FIG.10

WITHOUT CORRECTING ANY DEVIATION AMOUNT
THE AREA SEVERELY CHANGES FOR EACH HALFTONE DOT

CORRECTING ALL DEVIATION AMOUNT
SEPARATED DOWN ONE MORE PIXEL IN 2 THAN 1

THERE IS LESS EXTREME CHANGE IN DEGREE OF SEPARATION THAN CORRECTING ALL DEVIATION AMOUNT, AND THERE IS LESS SEVERE CHANGE IN THE AREA OF HALFTONE DOT THAN WITHOUT CORRECTING ANY DEVIATION AMOUNT

IMAGE FORMING APPARATUS AND METHOD CALCULATING A DEVIATION BETWEEN A) A REPRESENTATIVE POINT OF THRESHOLD INFORMATION I) NEAREST TO THE COORDINATE OF A PIXEL OF INTEREST OR II) IN DITHER SPACE NEAREST TO THE ADDRESS COORDINATE OF THE PIXEL OF INTEREST IN DITHER SPACE, AND B) THE ADDRESS COORDINATE IN DITHER SPACE CORRESPONDING TO A PIXEL COORDINATE OF AN INTEGER IN PIXEL SPACE OR A PIXEL COORDINATE OF AN INTEGER IN PIXEL SPACE NEAREST TO THE REPRESENTATIVE POINT

BACKGROUND OF THE INVENTION

1. Field of the Invention

The present invention relates to an image forming apparatus and an image forming method for generating a halftone image forming the halftone dots in accordance with an inputted multi-level gray-scale image.

2. Description of the Related Art

An electro-photographic image recording apparatus such as a copier or a laser beam printer using an electro-photographic method is well known as a high speed, high quality image forming apparatus. With the progress of digital technology in recent years, there is a growing demand for an electro-photographic image recording apparatus with higher image quality from the POD market to the office or home consumer market. Particularly in the high end market, there is a further growing demand for images undergoing a screen process such as printing. A screen process is a process for generating a color gradations with the number of color dots (color lines) or the density, not mixing the colors, such as in a paint. The human eye has a characteristic that a color looks thinner at a lower density of color dots, and the color looks denser at a higher density. Using this characteristic, the density of a color dot is controlled for each of yellow, magenta, cyan and black, and a full color is represented by combining the color dots (color lines).

The electro-photographic image recording apparatus records the image by exposing an image carrier to light, such as a laser beam, and can form all images from a binary image such as a character to an image including halftones such as a photograph. In regenerating a halftone, an image processing method such as a pulse width modulation method (PWM method), a dithering method or an error diffusion method is employed. Various patterns can be formed on an image carrier by use of such processing methods. The charged toner particles are attached to an obtained pattern on the image carrier, transferred to a transfer member and fixed, whereby the final output image can be obtained. Four colors of cyan (C), magenta (M), yellow (Y) and black (K) are generally used as the toner.

In the electro-photographic method, it is common that regular dither of dot intensive type is used to form the pattern by dithering. Dithering is a method for replacing the halftone with an aggregate of dots called halftone dots by binarizing the shading of an original image at a dither threshold value (threshold value formed in a predetermined pattern) according to a predetermined rule. With this method, since interference fringes (moiré) occur when halftone dots of four colors are superposed, a pattern in which an array of halftone dots has a different angle (screen angle) for each color of CMYK is created. The screen angle is the angle between the direction where the halftone dots are arranged and the vertical axis or the horizontal axis. Also, the number of halftone dots per unit length (how many halftone dots there are in an inch) is referred to as a screen line number. That is, the screen line number represents the fineness of halftone dots. As the screen line number increases (the number becomes larger), the halftone dots are less conspicuous to the naked eye, thereby providing printed matter of high quality. Conversely, as the screen line number decreases, the halftone dots are more conspicuous, giving a rough impression. In typical color printed matter, the screen angle is a combination of 15° for C, 75° for M, 0° for Y and 45° for K, and the screen line number is 133 or 175 lines. There are two methods, referred to as a rational tangent method and an irrational tangent method, for generating a pattern having a different screen angle for each color. The rational tangent method involves setting the tangent of the screen angle $\theta$ (tan $\theta$) to be a rational number, and the irrational tangent method involves setting tan $\theta$ to be an irrational number.

However, in the typical rational tangent method, any screen angle or screen line number may not be realized in some cases, depending on the resolution of image. FIG. 4 is a view showing one example of a dither table with the rational tangent method. In FIG. 4, although the dither table is closest to a screen line number of 175 lines and a screen angle of 15° at a resolution of 600 dpi, the actual screen line number or angle is different from the ideal. On the contrary, with the irrational tangent method, there is an advantage that the screen angle or screen line number can be easily changed. FIG. 5 is a view showing one example of a halftone dot pattern 501. The halftone dot pattern 501 is held in a halftone dot pattern table in which dither threshold values (THx, THy) each representing one halftone dot are arranged in two dimensions, like a lattice. The halftone dot pattern table has a table length of D. FIG. 6 is a view showing the typical dithering with the irrational tangent method. The X axis and the Y axis of FIG. 6 represent the recording pixel coordinate axes of image data in the main scanning direction and the sub-scanning direction, and the U axis and the V axis represent the address coordinate axes of the halftone dot pattern. Reference numeral 601 denotes the print image data. The coordinates A (Ay, Ax) of the image data in the recording pixel coordinate system X-Y can be subjected to coordinate transformation into the coordinates A (Av, Au) of the halftone dot pattern in the address coordinate system U-V in accordance with the following expression.

$$Au = (Ax \cdot \cos\theta + Ay \cdot \sin\theta) \cdot p$$

$$Au = (Ax \cdot \cos\theta + Ay \sim \sin\theta) \cdot p$$

$$Av = (-Ax \cdot \sin\theta + Ay \sim \cos\theta) \sim p$$

p=table length D of halftone dot pattern table/(resolution/screen line number)

At this time, p is the address coordinate conversion value in the image data of one pixel.

Using the above expression, the recording pixel coordinate system X-Y of the image data is transformed into the address coordinate system U-V of the halftone dot pattern. Further, an arbitrary screen angle or screen line number can be easily achieved with only one halftone dot pattern, using the residual value divided by the table length D of the halftone dot pattern table.

A technique as disclosed in U.S. Pat. No. 5,235,435 is a typical example of this irrational tangent method. However, in the irrational tangent method it is well known that there is a dispersion in the area of halftone dots formed at the same density depending on a variation in the correlation between the position of lattice points of the halftone dot pattern and the recording pixel position of the image data. Since this dispersion causes a periodic unevenness in the image, leading to an image defect, a method for adding a random number to the address coordinate has been proposed (e.g., refer to Japanese Patent Laid-Open No. S55-6393 (1980) and Japanese Patent Laid-Open No. S61-137473(1986)). However, with the above method using a random number, though the dispersion in the area of a formed halftone dot can be suppressed, there is a problem that irregularities in the halftone dots are likely to occur. Therefore, a method for correcting the address coordinate with the deviation amount by calculating the amount of deviation between the recording pixel coordinate and the address coordinate at a predetermined reference point in each unit dot area and correcting the amount of deviation depending on the distance between the reference point and the lattice point of the dot pattern has been proposed (e.g., refer to Japanese Patent Laid-Open No. H06-30276(1994)).

FIG. 16A shows an example of the halftone dots in which all of the deviation amount is not corrected (U.S. Pat. No. 5,235,435). Since the deviation amount is not corrected in this example, the area of the halftone dot is greatly different for each dot. As a result, even if the image before binarization has a certain density, the image after binarization contains a local change in the density. On the other hand, FIG. 16B shows an example of the halftone dots in which all the deviation amount is corrected (refer to Japanese Patent Laid-Open No. 6-30276(1994)). In this example, the area of all the halftone dots is the same, but the interval between the halftone dots is different. For example, the interval 2 is longer by one pixel than the interval 1 in FIG. 16B.

However, with the method as disclosed in Japanese Patent Laid-Open No. 6-30276(1994), it is required that the obtained deviation amount is interpolated with the distance between the above predetermined reference point and the lattice point of the halftone dot pattern. Further, the deviation amounts at a plurality of points may be used in some cases, resulting in a problem that the computation cost is increased accordingly. Also, if the areas of the halftone dots are perfectly matched, a specific pattern may occur in the low density area or the high density area at a longer period than the halftone dots, possibly leading to an image defect.

SUMMARY OF THE INVENTION

Thus, in the present invention, an image in which there is less dispersion in the area of the halftone dot than without correcting any deviation amount and there is less change in the distance between the halftone dots than correcting all the deviation amount is produced by selectively correcting the deviation amount (FIG. 16C).

According to a first aspect of the present invention, there is provided an image forming apparatus including: a coordinate transformation unit configured to transform a recording pixel coordinate of a pixel of interest in a pixel space into an address coordinate of the pixel of interest in a dither space, a representative point calculation unit configured to calculate a representative point of threshold information in the dither space nearest to the address coordinate of the pixel of interest in the dither space obtained by the coordinate transformation unit, a deviation amount calculation unit configured to calculate a deviation amount between the address coordinate in the dither space corresponding to a pixel coordinate of an integer in the pixel space and the representative point in the dither space by obtaining the pixel coordinate of the integer in the pixel space nearest to the representative point from the representative point in the dither space obtained by the representative point calculation unit, a correction value determination unit configured to determine whether or not to make the correction by adding the deviation amount calculated by the deviation amount calculation unit to the address coordinate of the pixel of interest in the dither space, an address correction unit configured to make the correction by adding the deviation amount calculated by the deviation amount calculation unit to the address coordinate of the pixel of interest in the dither space, if the addition is determined to be made by the correction value determination unit, and a threshold value processing unit configured to compare a dither threshold value represented by threshold information in the dither space corresponding to the coordinate obtained by rounding the address coordinate of the pixel of interest in the dither space obtained by addition in the address correction unit and a pixel value of the pixel of interest in the pixel space.

According to a second aspect of the present invention, there is provided an image forming apparatus including, a coordinate transformation unit configured to transform a recording pixel coordinate of a pixel of interest in a pixel space into an address coordinate of the pixel of interest in a dither space, a representative point calculation unit configured to calculate a representative point of threshold information in the dither space nearest to the address coordinate of the pixel of interest in the dither space obtained by the coordinate transformation unit, a deviation amount calculation unit configured to calculate the deviation amount between the address coordinate in the dither space corresponding to a pixel coordinate of an integer in the pixel space and the representative point in the dither space by obtaining the pixel coordinate of the integer in the pixel space nearest to the representative point from the representative point in the dither space obtained by the representative point calculation unit and an address correction unit configured to add the deviation amount calculated by the deviation amount calculation unit to the address coordinate of the pixel of interest in the dither space. The address correction unit changes a percentage of adding the deviation amount depending on the position of the representative point of threshold information in the dither space obtained by the representative point calculation unit.

According to a third aspect of the present invention, there is provided an image forming apparatus including, a deviation amount calculation unit configured to calculate the deviation amount between a representative point of threshold information nearest to the coordinate of a pixel of interest and a pixel coordinate of an integer in a pixel space nearest to the representative point, a correction value determination unit configured to determine whether to output the coordinate of the pixel of interest by adding all the deviation amount calculated by the deviation amount calculation unit or without adding any deviation amount calculated by the deviation amount calculation unit and a determination unit configured to determine a dither threshold value represented by threshold information for comparison with the pixel of interest using the result decided by the correction value determination unit. The correction value determination unit determines whether to output the coordinate of the pixel of interest by adding all the deviation amount calculated by the deviation amount calculation unit or without adding any deviation amount calculated by the deviation amount calculation unit depending on the coordinate of the representative point of threshold information nearest to the coordinate of the pixel of interest.

According to a fourth aspect of the present invention, there is provided an image forming method including the steps of, transforming a recording pixel coordinate of a pixel of interest in a pixel space into an address coordinate of the pixel of interest in a dither space, calculating a representative point of threshold information in the dither space nearest to the address coordinate of the pixel of interest in the dither space obtained at the transforming step, calculating the deviation amount between the address coordinate in the dither space corresponding to a pixel coordinate of an integer in the pixel space and the representative point in the dither space by obtaining the pixel coordinate of the integer in the pixel space nearest to the representative point from the representative point in the dither space obtained at the representative point calculating step, determining whether or not to make the correction by adding the deviation amount calculated at the deviation amount calculating step to the address coordinate of the pixel of interest in the dither space, making the correction by adding the deviation amount calculated at the deviation amount calculating step to the address coordinate of the pixel of interest in the dither space, if the addition is determined to be made at the determining step, and a comparing a dither threshold value represented by threshold information in the dither space corresponding to the coordinate obtained by rounding the address coordinate of the pixel of interest in the dither space obtained by addition at the correcting step and a pixel value of the pixel of interest in the pixel space.

According to a fifth aspect of the present invention, there is provided an image forming method including the steps of, transforming a recording pixel coordinate of a pixel of interest in a pixel space into an address coordinate of the pixel of interest in a dither space, calculating a representative point of threshold information in the dither space nearest to the address coordinate of the pixel of interest in the dither space obtained at the transforming step, calculating the deviation amount between the address coordinate in the dither space corresponding to a pixel coordinate of an integer in the pixel space and the representative point in the dither space by obtaining the pixel coordinate of the integer in the pixel space nearest to the representative point from the representative point in the dither space obtained at the representative point calculating step, and adding the deviation amount calculated at the deviation amount calculating step to the address coordinate of the pixel of interest in the dither space. The adding step includes changing a percentage of adding the deviation amount depending on the position of the representative point of threshold information in the dither space obtained at the representative point calculating step.

According to a sixth aspect of the present invention, there is provided an image forming method including the steps of, calculating the deviation amount between a representative point of threshold information nearest to the coordinate of a pixel of interest and a pixel coordinate of an integer in a pixel space nearest to the representative point, determining whether to output the coordinate of the pixel of interest by adding all the deviation amount calculated at the deviation amount calculating step or without adding any deviation amount calculated at the deviation amount calculating step, depending on the coordinate of the representative point of threshold information nearest to the coordinate of the pixel of interest, and determining a dither threshold value represented by threshold information for comparison with the pixel of interest using the result decided at the determining step.

With the invention, it is possible to suppress a periodic pattern by periodically changing the correction amount while suppressing dispersion in the area of each halftone dot at a low calculation cost by making the correction through the arithmetic operation of calculating the deviation amount at only one point without performing an interpolation operation.

Further features of the present invention will become apparent from the following description of exemplary embodiments (with reference to the attached drawings).

BRIEF DESCRIPTION OF THE DRAWING

FIG. 4 is a view showing one example of a dither table with a rational tangent method;

FIG. 5 is a view showing one example of a halftone dot pattern table;

FIG. 10 is a view showing one example of a correction amount table for holding the correction amount corresponding to the representative point;

DESCRIPTION OF THE EMBODIMENTS

The embodiments according to the present invention will be described below with reference to the drawings.

Embodiment 1

Embodiment 1 according to the invention will be described below in detail on the basis of the drawings.

Figure 1:
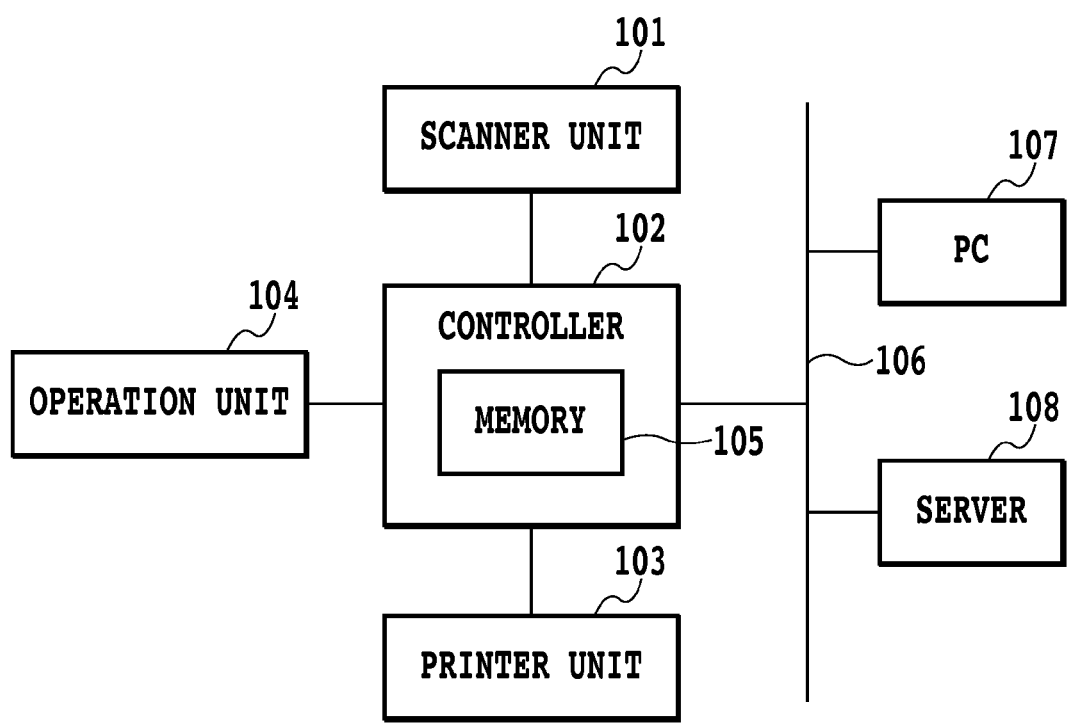
FIG. 1 is a block diagram showing the schematic configuration of an image forming apparatus.

FIG. 1 is a block diagram showing the schematic configuration of an image forming apparatus. The image forming apparatus is a digital multi-function apparatus having the typical COPY, PRINT, FAX functions and the like.

The image forming apparatus includes a scanner unit 101 for performing an original reading process, and a controller 102 for performing the image processing for an image read from the scanner unit 101 and storing the image in a memory 105. Further, the image forming apparatus has an operation unit 104 for setting various kinds of printing conditions for the image read by the scanner unit 101. Also, the image forming apparatus has a printer unit 103 for forming a visualized image of image data read from the memory 105 on a recording sheet in accordance with the set printing conditions set by the operation unit 104 and the like. The image forming apparatus is connected via a network 106 to a server 108 for managing the image data, a personal computer (PC) 107 for instructing the image forming apparatus to perform the printing and the like.

Figure 2:
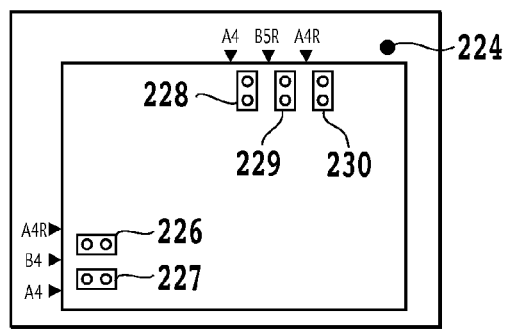
FIG. 2 is a cross-sectional view of the image forming apparatus.
Figure 2:
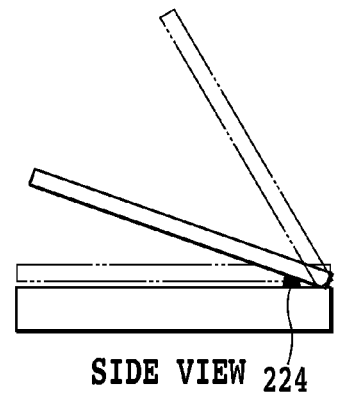
Figure 2:
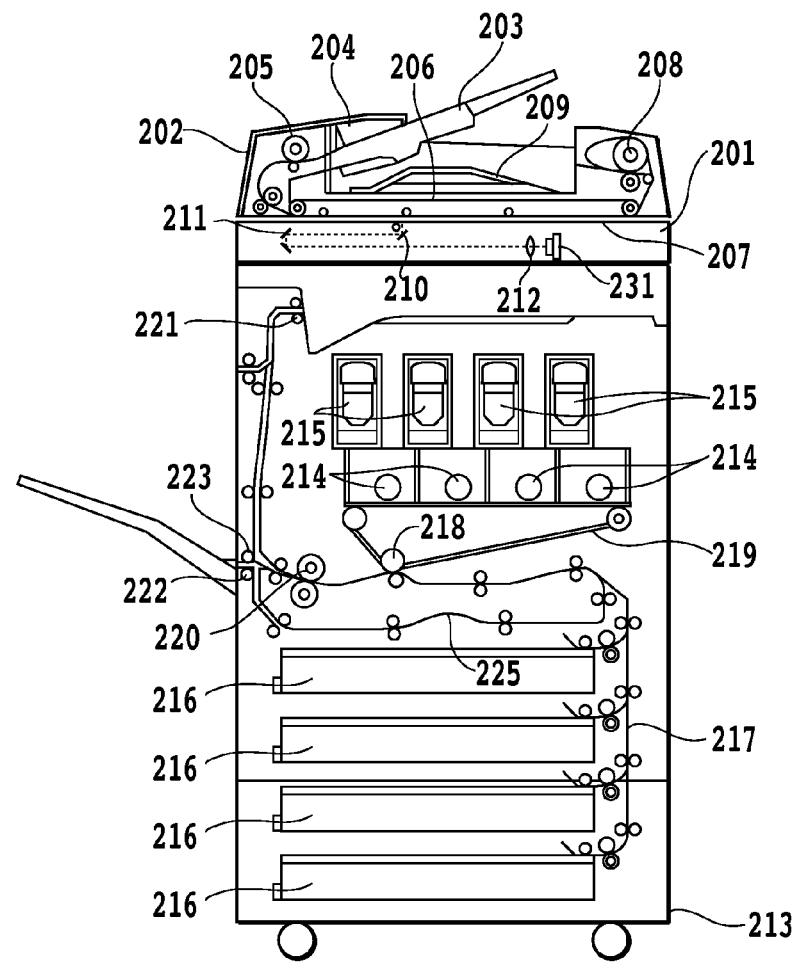

FIG. 2 is a cross-sectional view of the image forming apparatus and an upper view and a side view of a platen glass. Referring to FIG. 2, the detailed configuration of the image forming apparatus will be described below. The image forming apparatus performs the functions of copying, printing and faxing. In FIG. 2, the image forming apparatus has a scanner 201, a document feeder (DF) 202, and a printer 213 for color printing with four color drums.

First of all, the scanner reading operation will be described below.

In reading an original document set on the platen glass 207 of the scanner, the user sets the original on the platen glass 207 and closes the DF 202. After an opening/closing sensor 224 detects that the platen glass 207 is covered, the original size detection sensors 226 to 230 of the light reflection type within a casing of the scanner 201 detect the size of the original document. If the size is detected, light is applied from a light source 210 to the original, and a CCD (charge-coupled device) 231 receives light reflected from the original via a reflection plate 211 and a lens 212 to read an image. The controller of the image forming apparatus converts the image data read by the CCD 231 into a digital signal, and performs image processing for the scanner 201 to store the print image data in the memory within the controller.

In reading the original set in the DF 202, the user lays the original, face-up, on a tray of an original set portion 203 in the DF 202. Then, an original presence/absence sensor 204 detects that the original is set, and upon this detection, an original sheet feed roller 205 and a conveyer belt 206 are rotated to convey the original, so that the original is set at a predetermined position on the platen glass 207. In the following, the image is read in the same way as reading on the platen glass 207, whereby the obtained print image data is stored in the memory within the controller.

If the reading is completed, the conveyer belt 206 is rotated again to feed the original to the right in the cross-sectional view of the image forming apparatus as shown in FIG. 2, so that the original is ejected through a conveying roller 208 on the sheet output side into an original output tray 209. If a plurality of originals exist, the original is conveyed and ejected to the right from the platen glass 207 in the cross-sectional view of the image forming apparatus, and at the same time, the next original is fed from the left via the sheet feed roller 205 in the cross-sectional view of the image forming apparatus, whereby the reading of the next original is performed consecutively. The above is the operation of the scanner 201.

The printing operation of the printer 213 will be described below.

The print image data once stored in the memory within the controller is subjected again to the image processing for printing within the controller, and transferred to the printer 213. The details of the image processing for the printer will be described later. In the printer 213, the print image data is converted into a pulse signal under the PWM control of the printer unit 103, as will be described later, and converted into recording laser beams of four colors of yellow, magenta, cyan and black in a laser recording portion. The laser recording portion forms an electrostatic latent image on each photoconductor by applying a recording laser beam onto a photoconductor 214 of each color. The printer 213 performs toner development on each photoconductor with the toner supplied from a toner cartridge 215. A toner image visualized on each photoconductor is primarily transferred onto an intermediate transfer belt 219. The intermediate transfer belt 219 is rotated in a clockwise direction in FIG. 2. If the recording sheet supplied from a paper cassette 216 through a sheet feed conveying path 217 arrives at a secondary transfer position 218, the toner image is transferred onto the recording sheet from the intermediate transfer belt 219.

A fixing unit 220 fixes the toner by applying pressure and heat to the recording sheet onto which the image was transferred. The recording sheet is ejected through a paper/sheet output conveying path to a face down center tray 221, or a face up side tray 222. A flapper 223 switches the conveying paths to switch these sheet output openings. In the case of double sided printing, after the recording sheet passes through the fixing unit 220, the flapper 223 switches the conveying paths. If the conveying paths are switched, the recording sheet is switched back and fed downward, and fed through a double sided printing sheet conveying path 225 to the secondary transfer position 218 again. Thus, the double sided printing is performed on the recording sheet.

Figure 3:
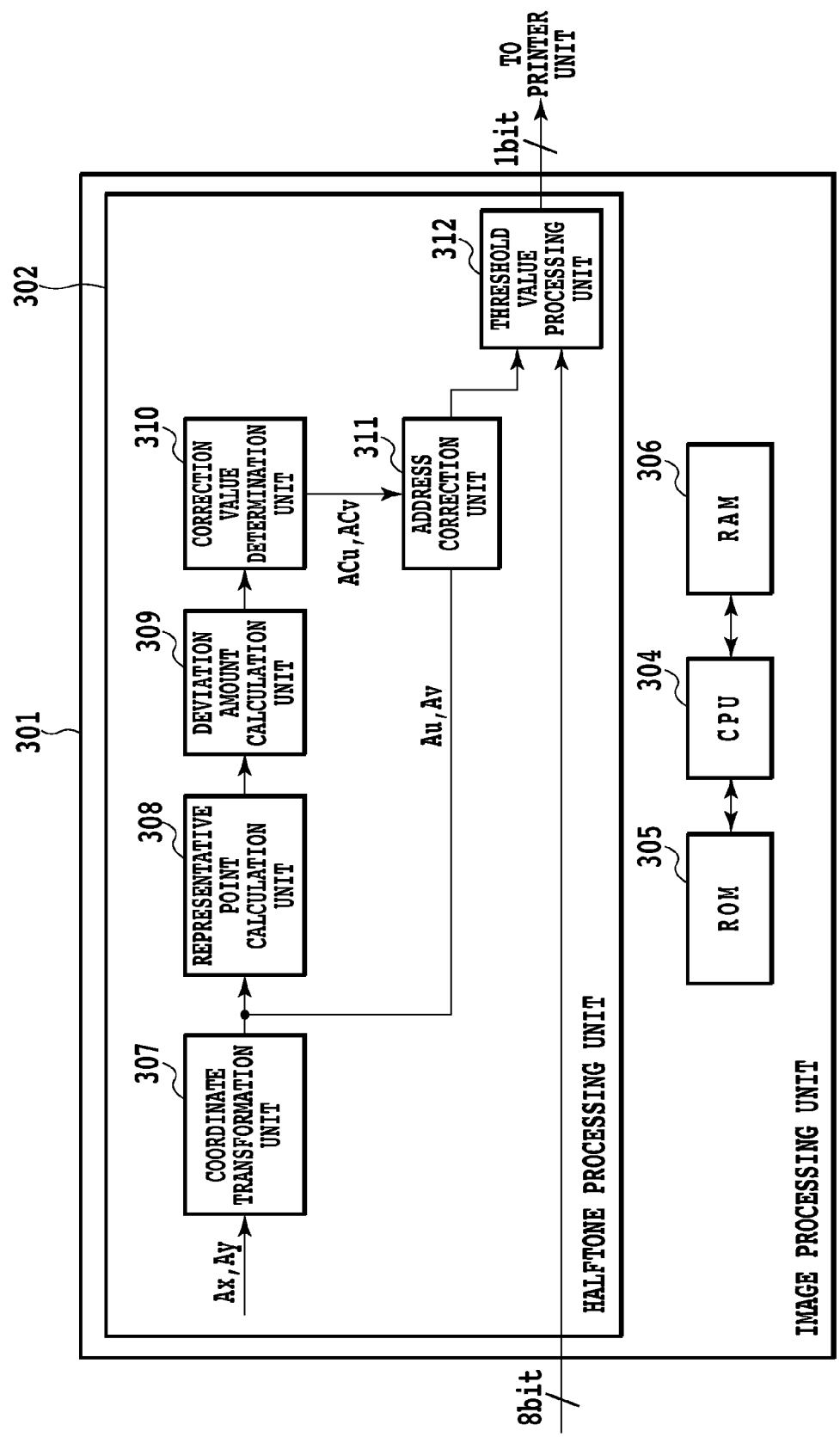
FIG. 3 is a block diagram showing the configuration of an image processing unit for performing the image processing for printing.

Referring to FIG. 3, an image process for printing will be described below in detail.

FIG. 3 is a block diagram showing the configuration of an image processing unit for performing the image processing for printing.

In FIG. 3, reference numeral 301 denotes the image processing unit for performing the image processing for printing by use of the controller 102. The image processing unit 301 comprises a CPU 304, a ROM 305, a RAM 306 and a halftone processing unit 302.

The halftone processing unit 302 comprises a coordinate transformation unit 307, a representative point calculation unit 308, a deviation amount calculation unit 309, a correction value determination unit 310, an address correction unit 311, and a threshold value processing unit 312. The halftone processing unit 302 receives the print image data (8-bit length data), which is once recorded in the memory within the controller, from the memory, and performs a dither process with an irrational tangent method as will be described later for the print image data. Through this process, the print image data is converted from the 8-bit length data into the one-bit length data. The print image data converted into the one-bit length data is sent to the printer.

The CPU 304 controls the overall operation of the image processing unit 301 based on a control program held in the ROM 305. The RAM 306 is used as a working area of the CPU 304. The RAM 306 further stores a halftone dot pattern table and a correction amount table as will be described later. A halftone dot pattern comprises the threshold information. Accordingly, it may be information in the table form, or information like a spot function. The spot function is a continuous function indicating the threshold value (refer to U.S. Pat. No. 5,235,435).

Figure 6:
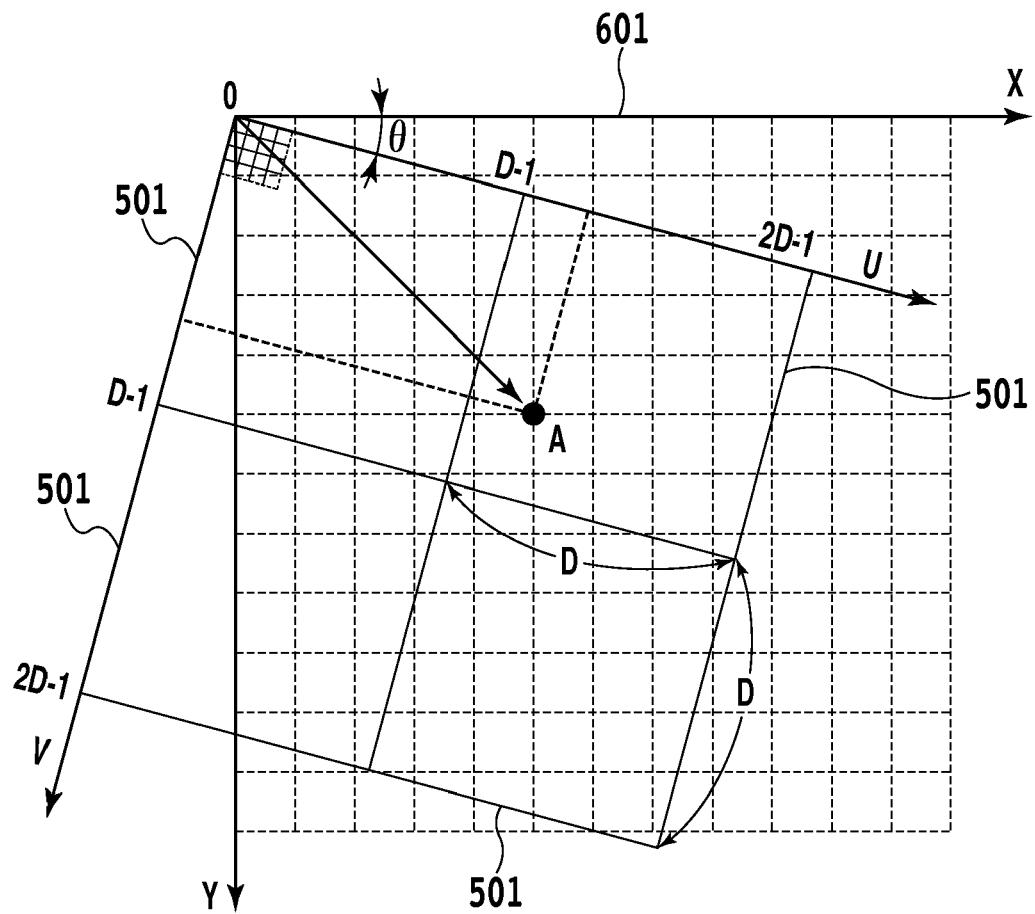
FIG. 6 is a typical view of dithering using an irrational tangent method.

Referring to FIGS. 3, 5 and 6, the details of a process with the halftone processing unit 302 will be described below.

FIG. 5 shows one example of a halftone dot pattern. The halftone dot pattern 501 is held in a halftone dot pattern table in which the dither threshold values each corresponding to one halftone dot are arranged in two dimensions like a lattice. The halftone dot pattern table has a table length of D. In the halftone dot pattern table, there are as many lattice points as the square of the table length D, in which the value indicated at each lattice point, is the dither threshold value. FIG. 6 is a typical view of dithering using the irrational tangent method. The X axis and the Y axis of FIG. 6 represent the recording pixel coordinates of image data in the main scanning direction and the sub-scanning direction, and the U axis and the V axis represent the address coordinates of the halftone dot pattern.

The halftone processing unit 302 inputs the pixel values of one pixel as the pixel of interest successively from the print image data 601 (see FIG. 6), in which the recording pixels composed of 8-bit length data are arranged like a lattice at an equal interval. A threshold value processing unit 312 compares the dither threshold value read from the halftone dot pattern table 501 (see FIG. 5) using the irrational tangent method, which will be described later, and the above pixel value. The threshold processing unit 312 outputs "1", if the pixel value is greater than or equal to the dither threshold value, as a result of comparison, or if not, outputs "0". As a result, the print image data is converted from 8-bit length data to one-bit length data.

Herein, though the bit length of the print image data outputted from the halftone processing unit 302 is one bit, a multi-value output is enabled if the halftone dot pattern table 501 is provided in multiple hierarchies according to the output gradation values, for example. That is, the bit length of the print image data outputted from the above threshold value process is not limited to one bit.

Referring to FIGS. 3, and 5 to 10, a method for reading the dither threshold value using the irrational tangent method in the embodiment 1 will be described below in detail.

Figure 7:
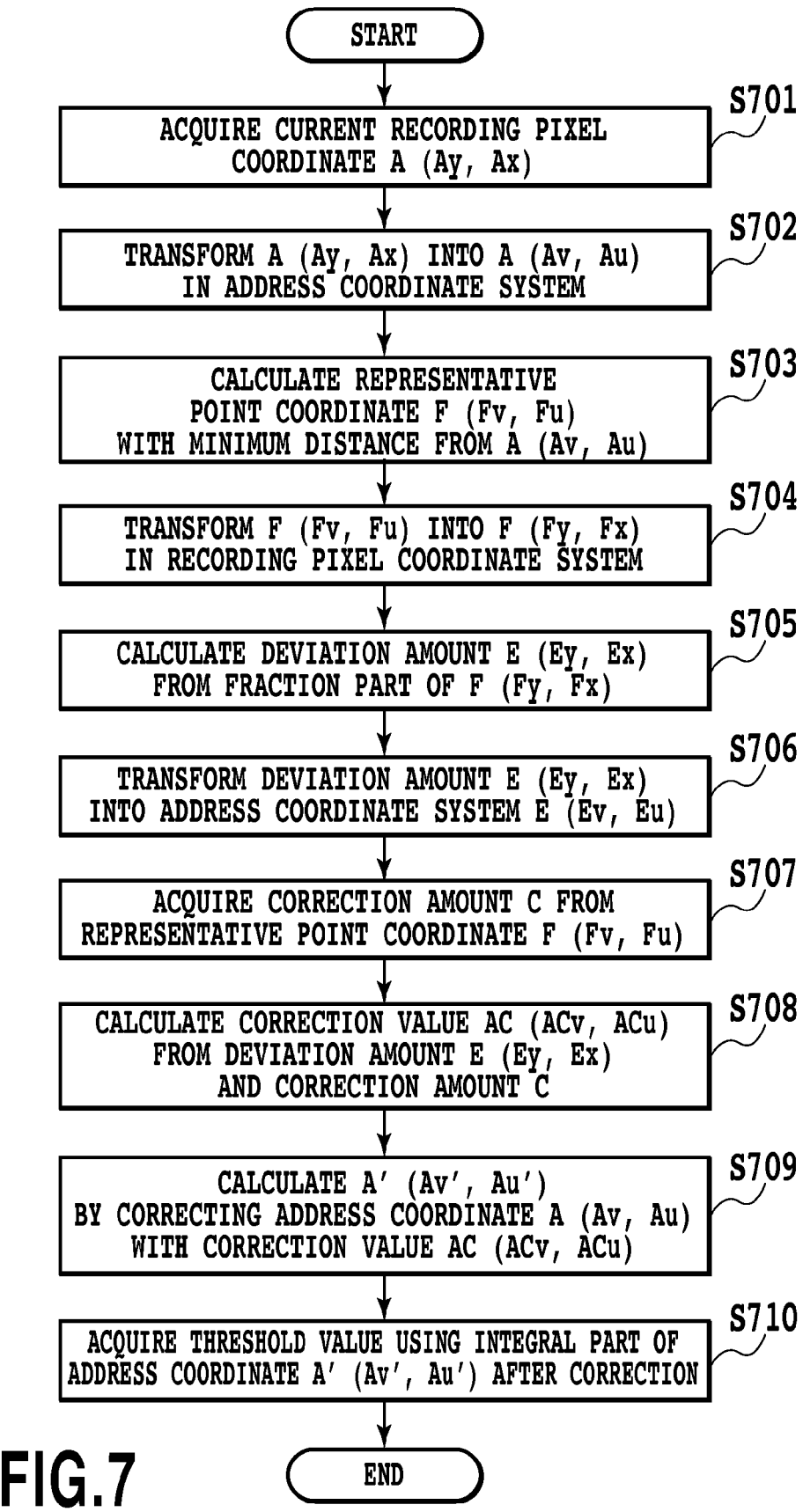
FIG. 7 is a flowchart showing a method for reading a dither threshold value with the irrational tangent method.
Figure 8:
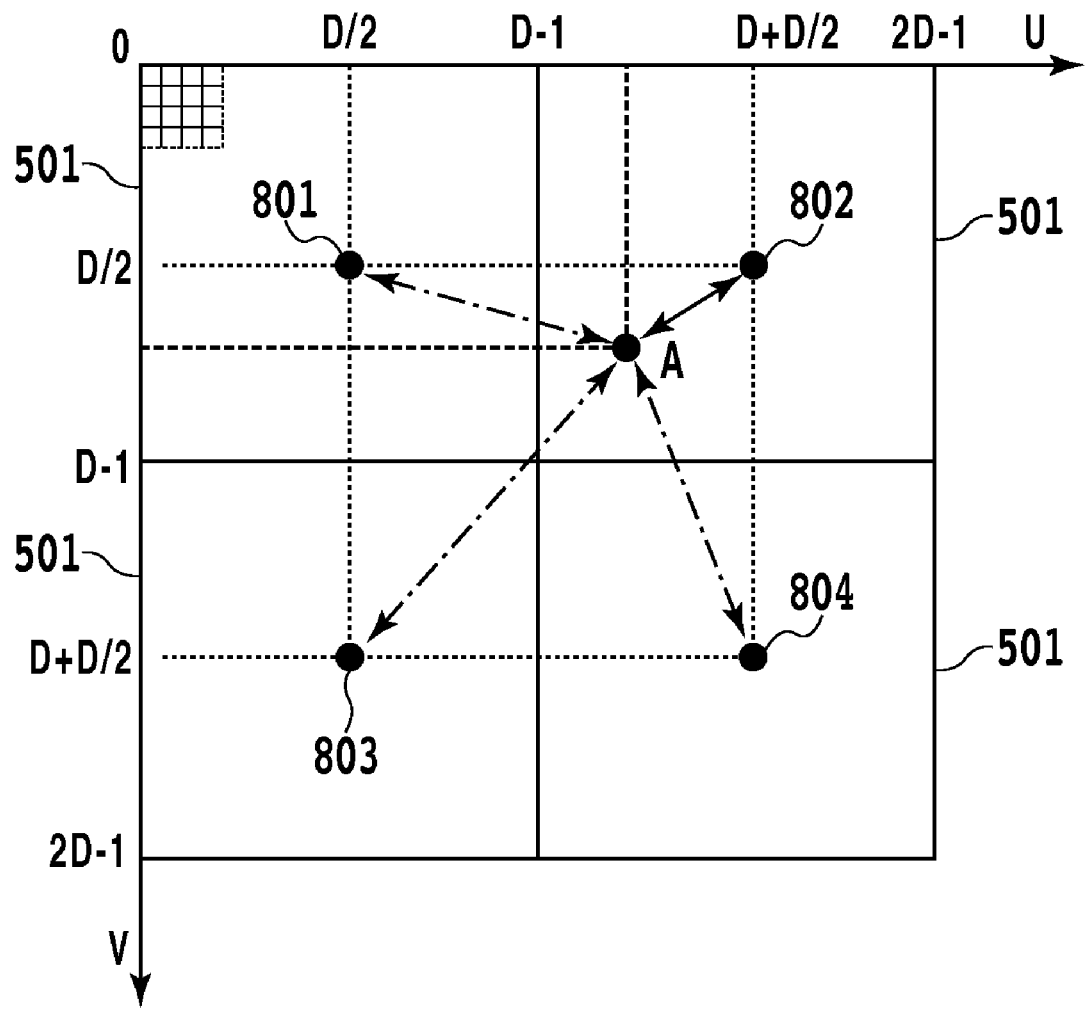
FIG. 8 is a view for explaining the relationship between a pixel of interest and a representative point in an embodiment 1.
Figure 9:
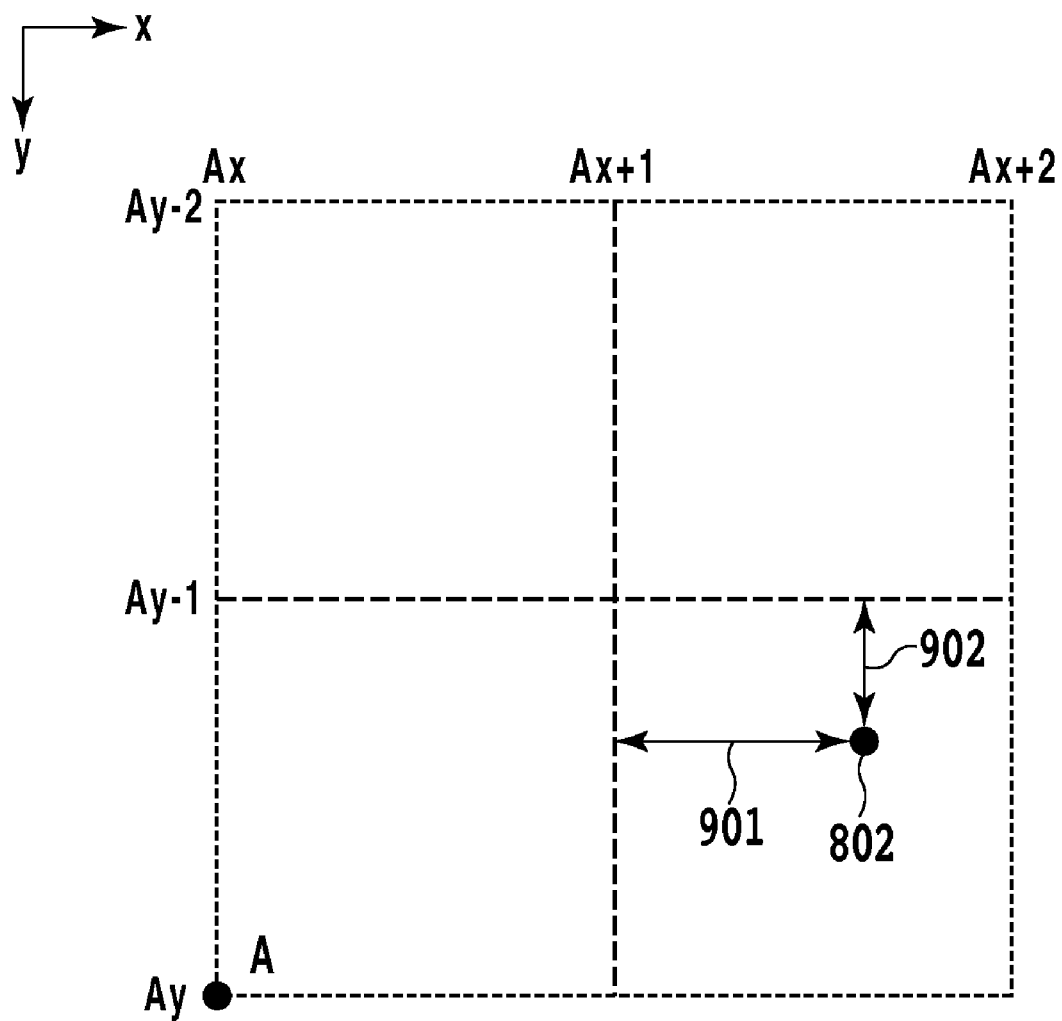
FIG. 9 is a view for explaining the deviation amount of the representative point having the smallest distance from the pixel of interest.

FIG. 7 is a flowchart showing a method for reading the dither threshold value using the irrational tangent method. FIG. 8 is a view for explaining the relationship between the pixel of interest in the address coordinate system U-V and the representative point in the embodiment 1. FIG. 9 is a view for explaining the deviation amount of the representative point having the smallest distance from the pixel of interest. FIG. 10 is a view showing one example of a correction amount table for holding the correction amount corresponding to the representative point.

At step S701, the coordinate transformation unit 307 acquires the coordinates in the recording pixel coordinate system X-Y (in the pixel space) corresponding to the input pixel of interest as previously described. Herein, it is assumed that the pixel of interest is A (Ay, Ax) (see FIG. 6) as an example.

At step S702, the coordinate transformation unit 307 transforms the acquired pixel of interest A (Ay, Ax) into the pixel A (Av, Au) in the address coordinate system U-V (in the dither space) (see FIG. 6). The transformation can be made by coordinate transformation in the following expression.

$$Au = (Ax \cdot \cos\theta + Ay \cdot \sin\theta) \cdot p$$

$$Av = (-Ax \cdot \sin\theta + Ay \cdot \cos\theta) \cdot p$$

p=table length D of halftone dot pattern table/(resolution/number of screen lines)

Where p is the address coordinate conversion value of one pixel. For example, in a case of performing the processing with a screen line number of 133 1pi (line per inch) for the print image data at a resolution 600 dpi (dot per inch), using the halftone dot pattern 501 as shown in FIG. 5, the address coordinate conversion value is about 3.55.

At step S703, the representative point calculation unit 308 calculates the representative point F (Fv, Fu) having the shortest distance from A (Av, Au) after coordinate transformation (see FIG. 8). In the embodiment 1, four representative points 801, 802, 803 and 804 always exist around the pixel of interest A (Av, Au), as shown in FIG. 8. They indicate the positions with the smallest dither threshold value in the halftone dot pattern 501 (see FIG. 5). That is, when the origin (0, 0) of the print image data 601 and the origin (0, 0) of the halftone dot pattern 501 are matched, they are offset by half (D/2, D/2) the table length D of the halftone dot pattern table, and arranged at an interval of D in the address coordinate system U-V. In FIG. 8, since the representative point having the smallest distance from the pixel of interest A (Av, Au) is 802, 802 is the representative point F (Fv, Fu).

At step S704, the deviation amount calculation unit 309 performs the coordinate transformation from the representative point F (Fv, Fu) in the address coordinate system U-V to the representative point F (Fy, Fx) in the recording pixel coordinate system X-Y. The coordinate transformation can be performed by the following expression.

$$Fx = (Fu \cdot \cos\theta - Fv \cdot \sin\theta)/p$$

$$Fy = (Fu \cdot \sin\theta + Fv \cdot \cos\theta)/p$$

Where p is the address coordinate conversion value of one pixel.

At step S705, the deviation amount calculation unit 309 obtains a fraction part of the representative point F (Fy, Fx), and makes the fraction part the deviation amount E (Ey, Ex). At this time, the deviation amount Ex in the X axis is 901 and the deviation amount Ey in the Y axis is 902, as shown in FIG. 9, whereby Ex and Ey are represented in the following expression.

$$Ex = Fx - \text{INT}(Fx)$$

$$Ey = Fy - \text{INT}(Fy)$$

INT denotes the operation of giving the integral part by truncating the fraction part.

At step S706, the deviation amount calculation unit 309 performs the coordinate transformation from the deviation amount E (Ey, Ex) in the recording pixel coordinate system X-Y to the deviation amount E (Ev, Eu) in the address coordinate system U-V. The coordinate transformation is performed through the same arithmetic operation as step S702.

At step S707, the correction value determination unit 310 calculates the correction amount C of the address coordinate at the representative point coordinates F (Fy, Fx) in the recording pixel coordinate system X-Y. The correction amount C is given to each representative point, and read from the correction amount table, for example, as shown in FIG. 10. The correction amount table has the correction values like a lattice corresponding to the position of the representative points from the origin (0, 0) in the address coordinate system. Assuming that the correction amount to be read and the coordinates of the correction amount table are denoted as C (Cy, Cx), Cy and Cx, these can be obtained from the following expression.

$$Cx = \text{MOD}(\text{INT}(Fx/D), Wc)$$

$$Cy = \text{MOD}(\text{INT}(Fy/D), Hc)$$

MOD denotes the residual operation to return the residue of the first argument divided by the second argument. Also, Wc denotes the width of the correction amount table, and Hc denotes the height of the correction amount table. In an example of FIG. 10, both Wc and Hc are 4. For example, the representative point is 802 in an example of FIG. 8, and Cx is 1 and Cy is 0, whereby C (0, 1) is C=0.90 from the correction amount table as shown in FIG. 10.

At step S708, the correction amount determination unit 310 obtains the address correction amount AC (ACv, ACu) in which the deviation amount E (Ev, Eu) is increased or decreased at any percentage using the correction amount C. AC (ACv, ACu) is $$ACu = Eu \times C$$

$$ACv = Ev \times C$$

At step S709, the address correction unit 311 adds the address correction value AC (ACv, ACu) to the pixel of interest coordinate A (Av, Au) in the address coordinate system, and calculates the A' (Av', Au') in which the address coordinate is corrected.

$$Au' = Au + ACu$$

$$Av' = Av + ACv$$

At step S710, the threshold value processing unit 312 acquires the dither threshold value from the halftone dot pattern 501, using the integral part of the pixel of interest coordinate A' (Av', Au') after correction. In the address coordinate system U-V, the halftone dot pattern 501 is arranged with the table length D on the tiles, as shown in FIG. 6. Accordingly, the dither threshold value TH (THv, THu) in the halftone dot pattern 501 is obtained from $$THu = MOD(INT(Au'), D)$$

$$THv = MOD(INT(Av'), D)$$

That is, the coordinate of the residue in which the integral part of the address coordinate is divided by the table length D corresponds to the lattice point in the halftone dot pattern 501, and the dither threshold value TH is acquired from the concerned lattice point.

Figure 11:
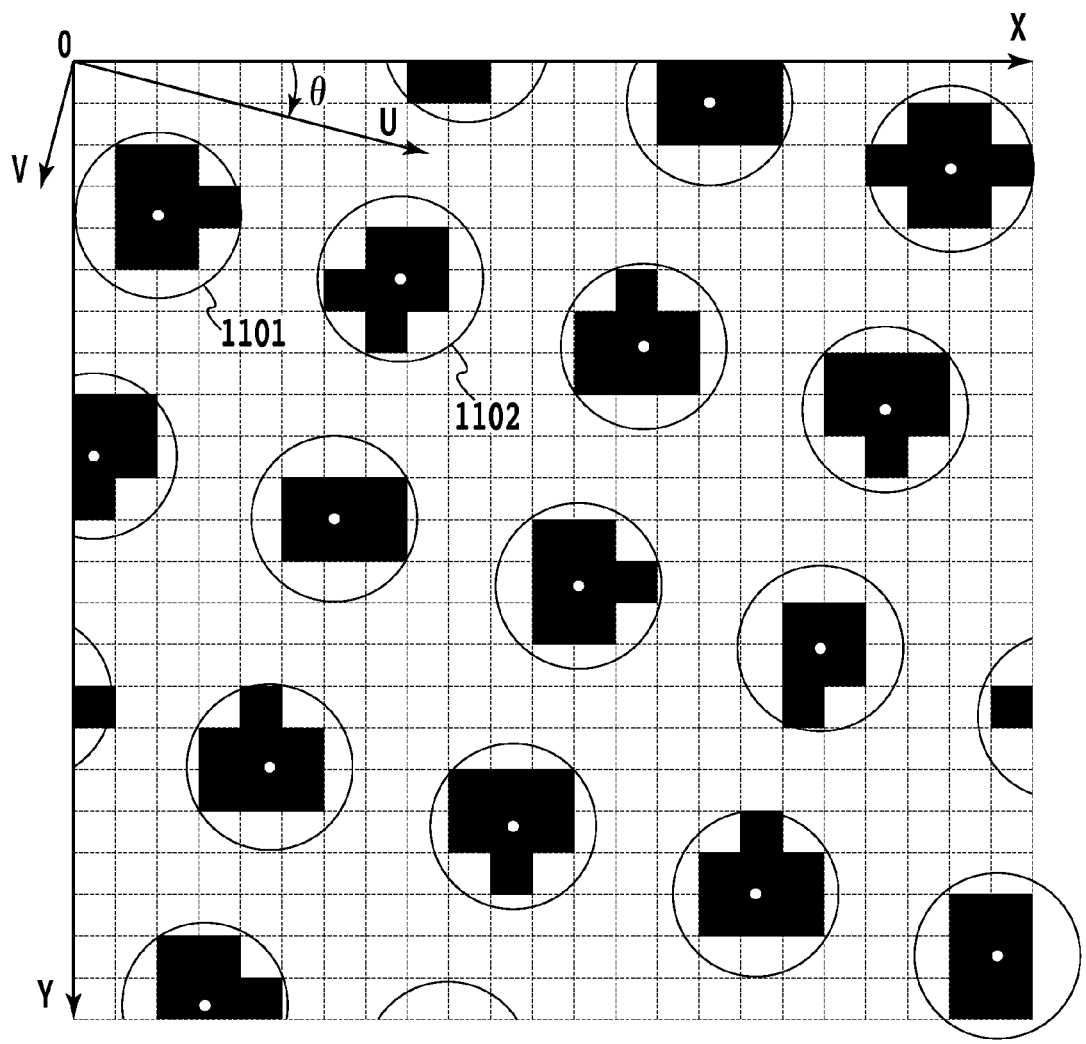
FIG. 11 is a view showing one example of the processing result of dithering using the irrational tangent method without correcting the deviation amount.
Figure 12:
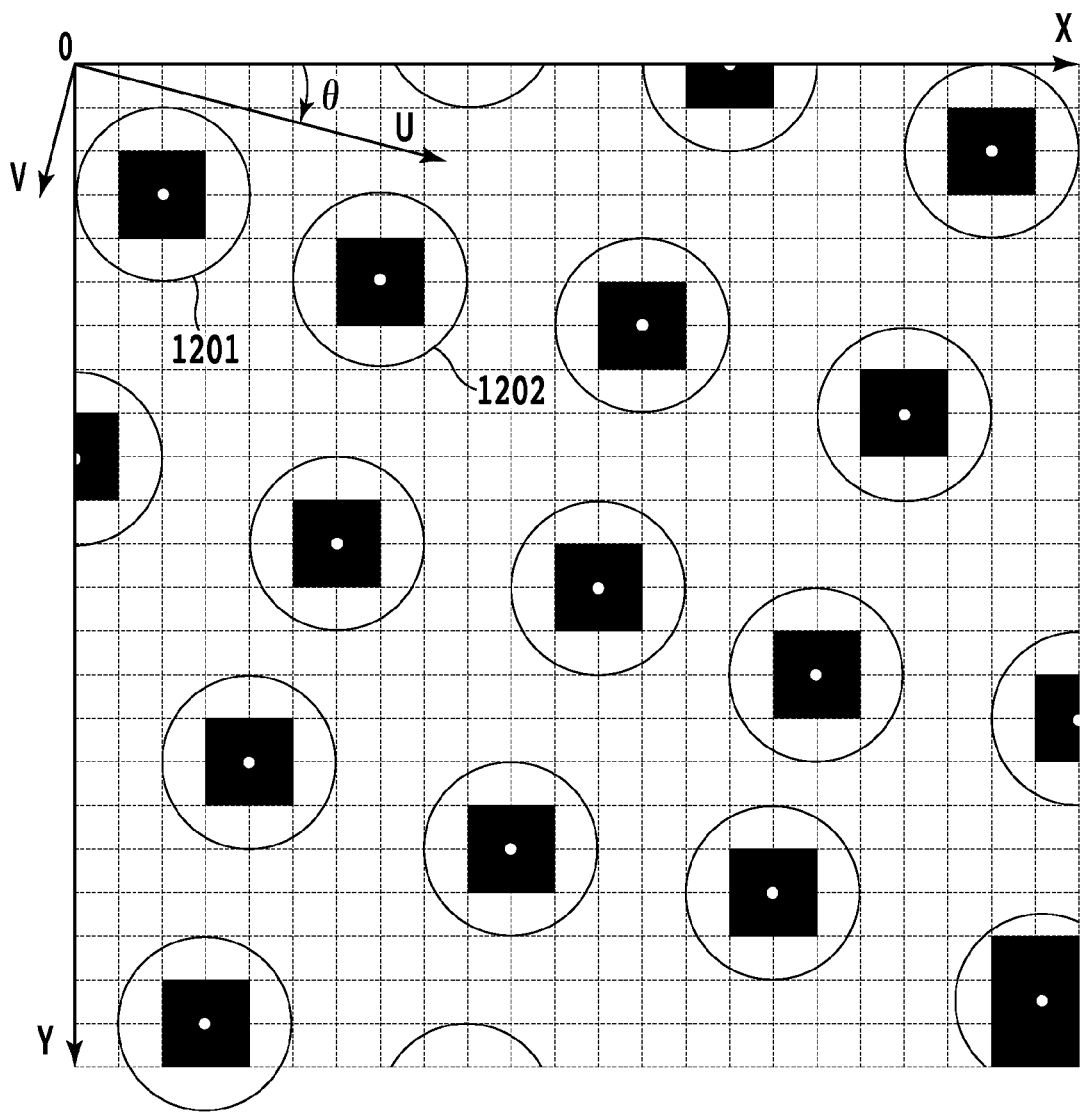
FIG. 12 is a view showing one example of the processing result of dithering using the irrational tangent method by correcting all the deviation amount.
Figure 13:
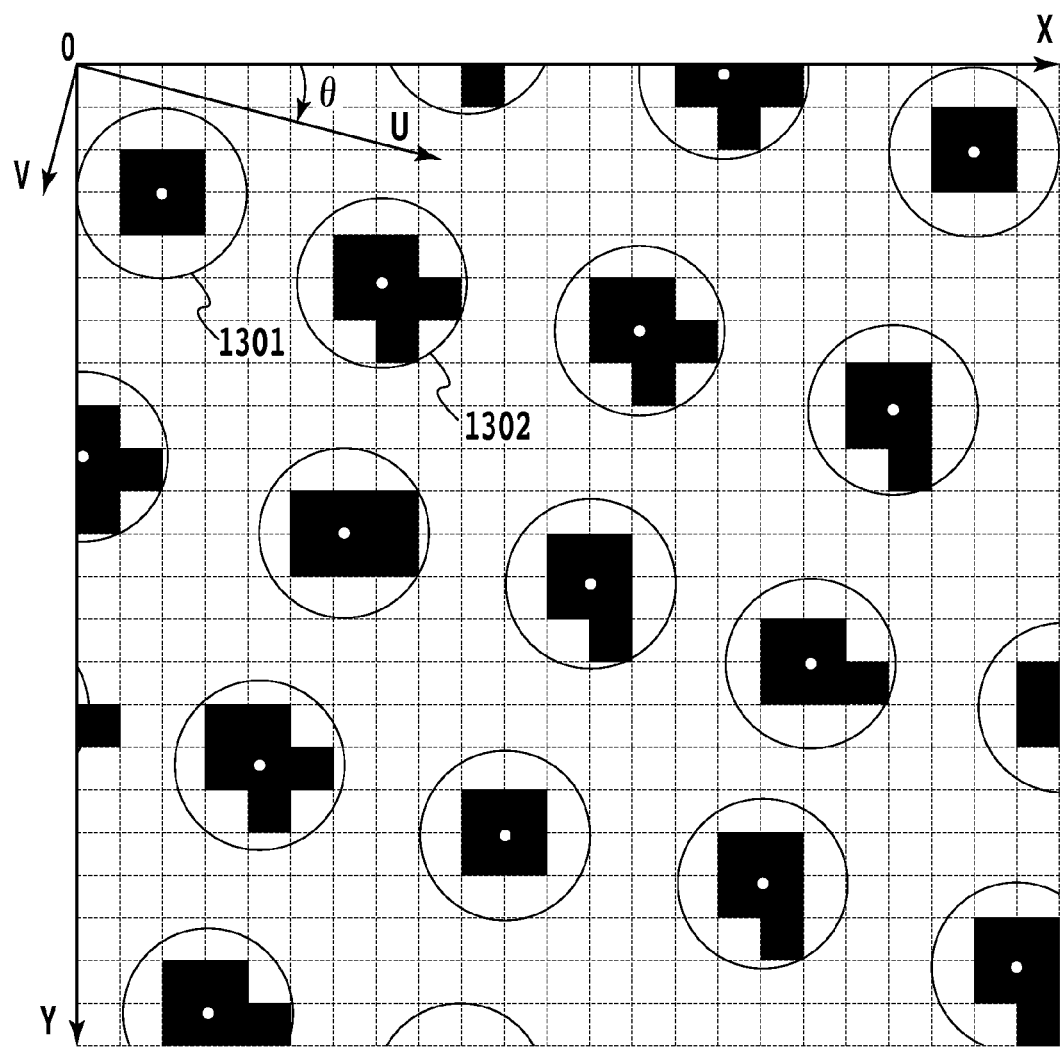
FIG. 13 is a view showing one example of the processing result of dithering using the irrational tangent method in the embodiment 1.

FIG. 11 shows one example of the processing result of dithering with the irrational tangent method without correcting the deviation amount. FIG. 12 is a view showing one example of the processing result of dithering with the irrational tangent method by correcting all the deviation amount. FIG. 13 is a view showing one example of the processing result of dithering using the irrational tangent method in the embodiment 1, using the correction amount table as shown in FIG. 10. FIGS. 11, 12 and 13 show the results of performing the process at a uniform density of about 15%.

From FIG. 11, it can be understood that the area of each halftone dot (1101, 1102) is greatly dispersed because the deviation amount is not corrected. The image has unevenness. Also, the areas of the halftone dots (1201, 1202) are perfectly matched by correcting all the deviation amount in FIG. 12. However, if the areas of the halftone dots are perfectly matched, a periodic pattern may occur on the image, causing an image defect in some cases, as previously described. On the contrary, the correction amount is changed periodically in accordance with the correction amount table, and the areas are not perfectly matched while suppressing a dispersion in the area of each dot (1301, 1302), whereby the periodic pattern can be suppressed in FIG. 13.

Though the correction amount C is held in the correction amount table in the embodiment 1, the correction amount C (addition percentage) may be obtained for each representative point, using the random number, for example. In this case, at step S707 in the method for reading the dither threshold value using the irrational tangent method, the operation of obtaining the coordinates in the correction amount table can be omitted.

Embodiment 2

Embodiment 2 according to the invention will be described below in detail using the drawings.

Embodiment 2 is the same as embodiment 1, except for the representative point calculation process in the method for reading the dither threshold value using the irrational tangent method in the embodiment 1, and the explanation of the details of the embodiment 2 is omitted.

Figure 14:
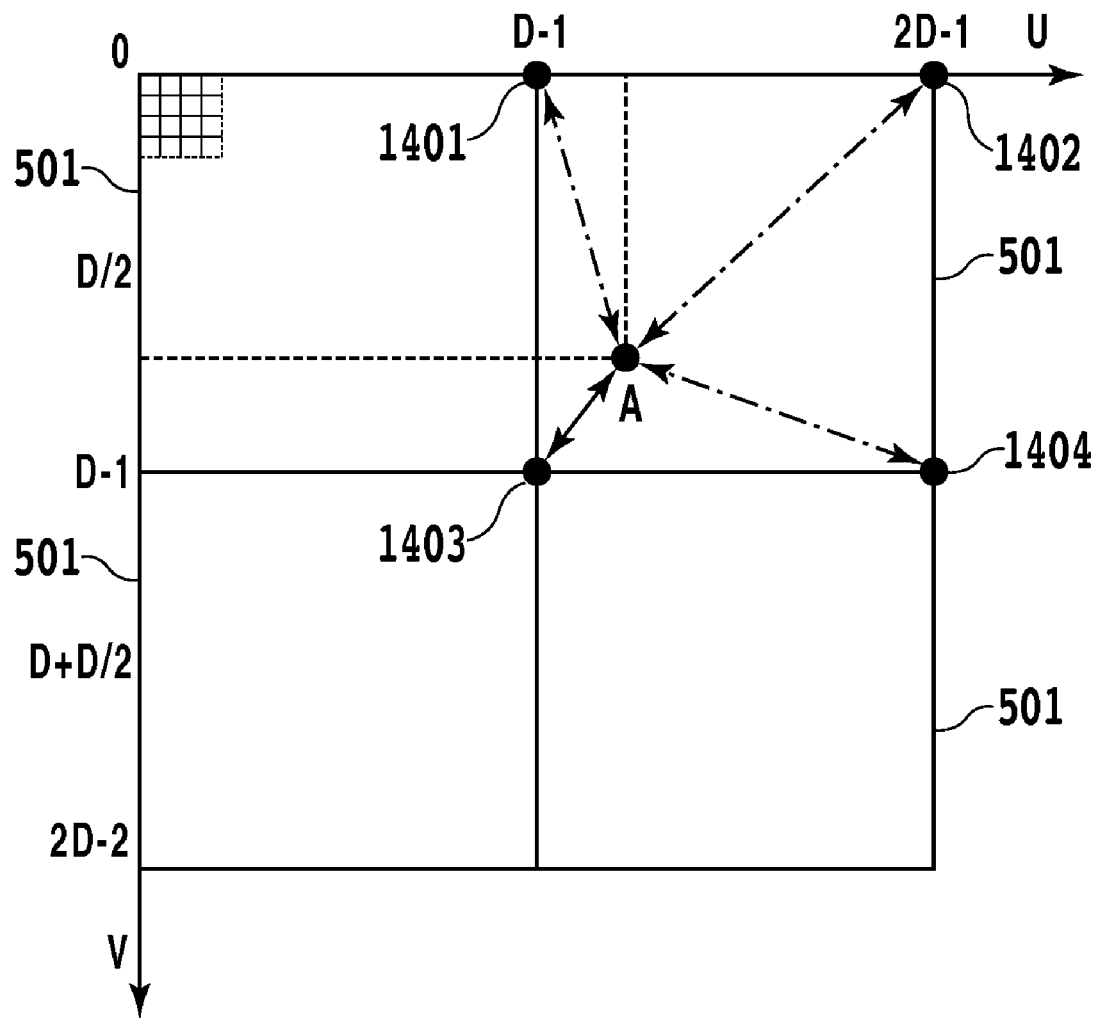
FIG. 14 is a view for explaining the relationship between a pixel of interest and a representative point in an embodiment 2.

Referring to FIGS. 7 and 14, the operation of the representative point calculation unit 308 in the embodiment 2 will be described in detail.

FIG. 14 is a view for explaining the relationship between the pixel of interest A (Av, Au) in the address coordinate system U-V and the representative point in embodiment 2.

Though the representative point calculation unit 308 obtains the representative point coordinate F (Fv, Fu) having the smallest distance from A (Av, Au) after coordinate transformation at step S703, the position at which the dither threshold value is largest in the dot pattern 501 is used in the embodiment 2. That is, there are four representative points (1401, 1402, 1403, 1404) around the pixel of interest A (Av, Au). These representative points are arranged at an interval of the table length D of the dot pattern table in the address coordinate system U-V, when the origin (0, 0) of the print image data 601 and the origin (0, 0) of the dot pattern 501 are matched. In FIG. 14, the representative point having the smallest distance from the pixel of interest A (Av, Au) is 1403, whereby 1403 is the representative point coordinate F (Fv, Fu).

Embodiment 3

Embodiment 3 according to the invention will be described below in detail using the drawings.

Embodiment 3 is the same as embodiment 1, except for the representative point calculation process in the method for reading the dither threshold value with the irrational tangent method in the embodiment 1, and the explanation of the details of the embodiment 3 is omitted.

Figure 15:
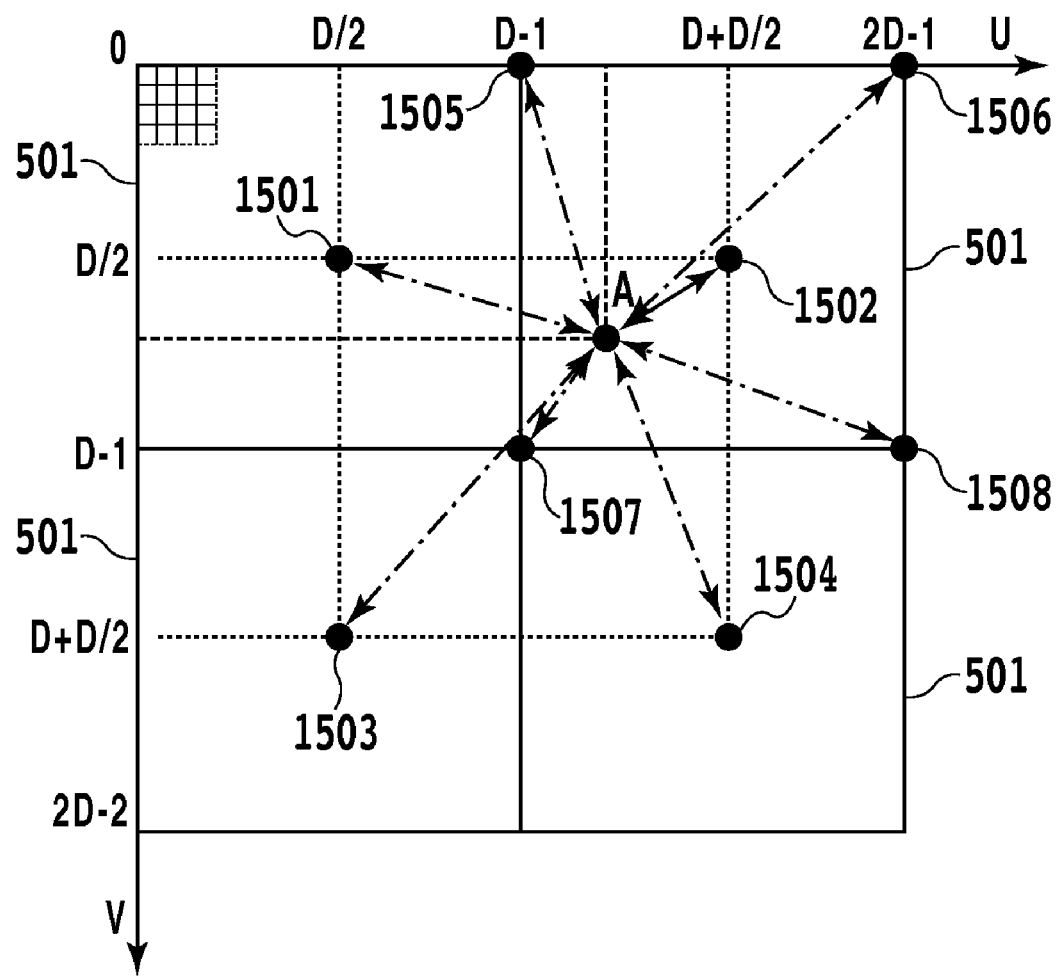
FIG. 15 is a view for explaining the relationship between a pixel of interest and a representative point in an embodiment 3.
Figure 16A:
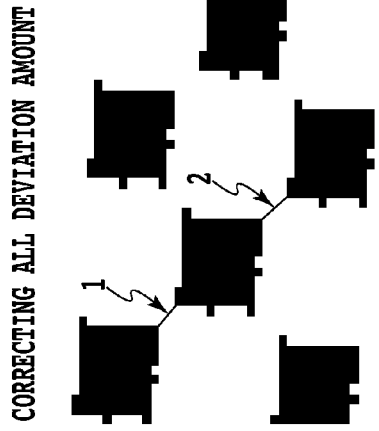
FIG. 16A to FIG. 16C are views showing an example of halftone dots generated in the conventional example and an example of halftone dots generated according to the invention.
Figure 16B:
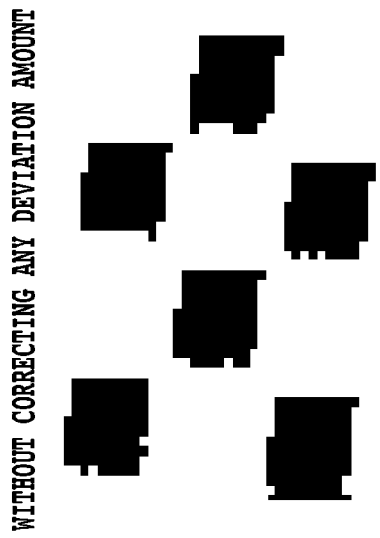
Figure 16C:
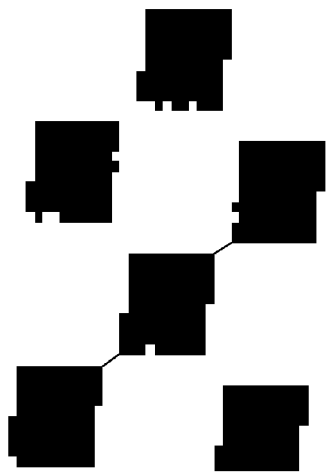

Referring to FIGS. 7 and 15, the operation of the representative point calculation unit 308 in the embodiment 3 will be described below in detail.

FIG. 15 is a view for explaining the relationship between the pixel of interest A (Av, Au) in the address coordinate system U-V and the representative point in the embodiment 3.

Though the representative point calculation unit 308 obtains the representative point coordinate F (Fv, Fu) having the smallest distance from A (Av, Au) after coordinate transformation at step S703, the positions at which the dither threshold value is smallest and largest in the dot pattern 501 are used in the embodiment 3. That is, there are the representative points 1501 to 1504 having the minimum dither threshold value and the representative points 1505 to 1508 having the maximum dither threshold value around the pixel of interest A (Av, Au). The representative points having the minimum dither threshold value are offset by half (D/2, D/2) the table length D of the halftone dot pattern table, when the origin (0, 0) of the print image data 601 and the origin (0, 0) of the halftone dot pattern 501 are matched. Accordingly, the representative points are arranged at an interval of D in the address coordinate system U-V. Also, the representative points having the minimum dither threshold value are arranged at an interval of the table length D of the halftone dot pattern table in the address coordinate system U-V, when the origin (0, 0) of the print image data 601 and the origin (0, 0) of the halftone dot pattern 501 are matched. In an example as shown in FIG. 15, the representative point having the minimum distance from the pixel of interest A (Av, Au) is 1502, whereby 1502 is the representative point coordinate F (Fv, Fu).

Other Embodiments

The invention may be applied to a system comprising a plurality of devices (e.g., host computer, interface unit, reader, printer and the like), or an apparatus composed of one device (e.g., copier, facsimile and the like).

A processing method for storing a program for implementing the functions of the above embodiments in a computer readable recording medium and reading the program stored in the recording medium as the code to execute it on a computer may be also included within the category of the above embodiments. Also, the recording medium storing the program as well as the program itself may be included in the above embodiments.

Such recording media include a floppy (registered trademark) disk, a hard disk, an optical disk, a magneto-optical disk, CD-ROM, a magnetic tape, a non-volatile memory card and ROM, for example.

Also, not only the process performed singly by the program stored in the above recording medium, but also the process operating on an OS in cooperation with the functions of other software and an extension board to perform the operation of the above embodiments may be also included in the category of the above embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-58529, filed Mar. 7, 2008, which is hereby incorporated by reference herein in its entirety.

What is claimed is:

1. An image forming apparatus comprising:
   a coordinate transformation unit configured to transform a recording pixel coordinate of a pixel of interest in a pixel space into an address coordinate of the pixel of interest in a dither space;
   a representative point calculation unit configured to calculate a representative point of threshold information in the dither space nearest to the address coordinate of the pixel of interest in the dither space obtained by said coordinate transformation unit;
   a deviation amount calculation unit configured to calculate a deviation amount between the address coordinate in the dither space corresponding to a pixel coordinate of an integer in said pixel space and the representative point in said dither space by obtaining the pixel coordinate of the integer in the pixel space nearest to said representative point from the representative point in the dither space obtained by said representative point calculation unit;
   a correction value determination unit configured to determine whether or not to make a correction by adding the deviation amount calculated by said deviation amount calculation unit to the address coordinate of the pixel of interest in said dither space;
   an address correction unit configured to make the correction by adding the deviation amount calculated by said deviation amount calculation unit to the address coordinate of the pixel of interest in said dither space, if the addition is determined to be made by said correction value determination unit; and
   a threshold value processing unit configured to compare a dither threshold value represented by threshold information in the dither space corresponding to the coordinate obtained by rounding the address coordinate of the pixel of interest in the dither space obtained by addition in said address correction unit and a pixel value of the pixel of interest in said pixel space.

2. The image forming apparatus according to claim 1, wherein said correction value determination unit determines periodically whether or not to make the addition depending on the position of the representative point of threshold information in the dither space obtained by said representative point calculation unit.

3. An image forming apparatus comprising:
   a coordinate transformation unit configured to transform a recording pixel coordinate of a pixel of interest in a pixel space into an address coordinate of the pixel of interest in a dither space;
   a representative point calculation unit configured to calculate a representative point of threshold information in the dither space nearest to the address coordinate of the pixel of interest in the dither space obtained by said coordinate transformation unit;
   a deviation amount calculation unit configured to calculate the deviation amount between the address coordinate in the dither space corresponding to a pixel coordinate of an integer in said pixel space and the representative point in said dither space by obtaining the pixel coordinate of the integer in the pixel space nearest to said representative point from the representative point in the dither space obtained by said representative point calculation unit; and
   an address correction unit configured to add the deviation amount calculated by said deviation amount calculation unit to the address coordinate of the pixel of interest in said dither space,
   wherein said address correction unit changes a percentage of adding said deviation amount, depending on the position of the representative point of threshold information in the dither space obtained by said representative point calculation unit.

4. An image forming apparatus comprising:
   a deviation amount calculation unit configured to calculate the deviation amount between a representative point of threshold information nearest to the coordinate of a pixel of interest and a pixel coordinate of an integer in a pixel space nearest to said representative point;
   a correction value determination unit configured to determine whether to output the coordinate of said pixel of interest by adding all the deviation amount calculated by said deviation amount calculation unit or without adding any deviation amount calculated by said deviation amount calculation unit; and
   a determination unit configured to determine a dither threshold value represented by threshold information for comparison with said pixel of interest using the result determined by said correction value determination unit,
   wherein said correction value determination unit determines whether to output the coordinate of said pixel of interest by adding all the deviation amount calculated by said deviation amount calculation unit or without adding any deviation amount calculated by said deviation amount calculation unit depending on the coordinate of the representative point of threshold information nearest to the coordinate of said pixel of interest.

5. An image forming method comprising the steps of:
- transforming a recording pixel coordinate of a pixel of interest in a pixel space into an address coordinate of the pixel of interest in a dither space;
- calculating a representative point of threshold information in the dither space nearest to the address coordinate of the pixel of interest in the dither space obtained at said transforming step;
- calculating the deviation amount between the address coordinate in the dither space corresponding to a pixel coordinate of an integer in said pixel space and the representative point in said dither space by obtaining the pixel coordinate of the integer in the pixel space nearest to said representative point from the representative point in the dither space obtained at said representative point calculating step;
- determining whether or not to make a correction by adding the deviation amount calculated at said deviation amount calculating step to the address coordinate of the pixel of interest in said dither space;
- making the correction by adding the deviation amount calculated at said deviation amount calculating step to the address coordinate of the pixel of interest in said dither space, if the addition is determined to be made at said determining step; and
- comparing a dither threshold value represented by threshold information in the dither space corresponding to the coordinate obtained by rounding the address coordinate of the pixel of interest in the dither space obtained by addition at said correcting step and a pixel value of the pixel of interest in said pixel space.

6. The image forming method according to claim 5, wherein said determining step includes determining periodically whether or not to make the addition depending on the position of the representative point of threshold information in the dither space obtained by said representative point calculating step.

7. An image forming method comprising the steps of:
- transforming a recording pixel coordinate of a pixel of interest in a pixel space into an address coordinate of the pixel of interest in a dither space;
- calculating a representative point of threshold information in the dither space nearest to the address coordinate of the pixel of interest in the dither space obtained at said transforming step;
- calculating the deviation amount between the address coordinate in the dither space corresponding to a pixel coordinate of an integer in said pixel space and the representative point in said dither space by obtaining the pixel coordinate of the integer in the pixel space nearest to said representative point from the representative point in the dither space obtained at said representative point calculating step; and
- adding the deviation amount calculated at said deviation amount calculating step to the address coordinate of the pixel of interest in said dither space,
- wherein said adding step includes changing a percentage of adding said deviation amount depending on the position of the representative point of threshold information in the dither space obtained at said representative point calculating step.

8. An image forming method comprising the steps of:
- calculating the deviation amount between a representative point of threshold information nearest to the coordinate of a pixel of interest and a pixel coordinate of an integer in a pixel space nearest to said representative point;
- determining whether to output the coordinate of said pixel of interest by adding all the deviation amount calculated at said deviation amount calculating step or without adding any deviation amount calculated at said deviation amount calculating step depending on the coordinate of the representative point of threshold information nearest to the coordinate of said pixel of interest; and
- determining a dither threshold value represented by threshold information for comparison with said pixel of interest using the result determined at said determining step.

\* \* \* \* \*